United States Patent
Sebralla et al.

(10) Patent No.: US 11,261,531 B2
(45) Date of Patent: Mar. 1, 2022

(54) METHOD FOR PRETREATING ALUMINUM MATERIALS, PARTICULARLY ALUMINUM WHEELS

(71) Applicants: CHEMETALL GMBH, Frankfurt (DE); RHODIA OPERATIONS, Aubervilliers (FR)

(72) Inventors: Lars Sebralla, Frankfurt am Main (DE); Nawel Souad Khelfallah, Frankfurt am Main (DE); Manfred Walter, Frankfurt am Main (DE); Marie-Pierre Labeau, Sèvres (FR); Guillaume Gody, Rueil-Malmaison (FR)

(73) Assignees: CHEMETALL GMBH, Frankfurt (DE); RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 16/645,725

(22) PCT Filed: Sep. 11, 2018

(86) PCT No.: PCT/EP2018/074512
§ 371 (c)(1),
(2) Date: Mar. 9, 2020

(87) PCT Pub. No.: WO2019/053023
PCT Pub. Date: Mar. 21, 2019

(65) Prior Publication Data
US 2020/0299847 A1    Sep. 24, 2020

(30) Foreign Application Priority Data

Sep. 14, 2017 (EP) .................... 17191077

(51) Int. Cl.
| | |
|---|---|
| C23G 1/12 | (2006.01) |
| C23C 22/80 | (2006.01) |
| B05D 7/16 | (2006.01) |
| C09D 133/02 | (2006.01) |
| C09D 143/02 | (2006.01) |
| C09D 5/08 | (2006.01) |
| C23C 22/34 | (2006.01) |
| C23G 1/22 | (2006.01) |

(52) U.S. Cl.
CPC .............. *C23G 1/125* (2013.01); *B05D 7/16* (2013.01); *C09D 5/084* (2013.01); *C09D 133/02* (2013.01); *C09D 143/02* (2013.01); *C23C 22/34* (2013.01); *C23C 22/80* (2013.01); *C23G 1/22* (2013.01); *B05D 2202/25* (2013.01); *B05D 2502/00* (2013.01); *C23C 2222/20* (2013.01)

(58) Field of Classification Search
CPC .. B05D 7/16; B05D 2502/00; B05D 2202/25; C23C 22/34; C23C 22/80; C23C 22/44; C23C 22/73; C23C 22/76; C23C 22/78; C23C 22/82; C23G 1/125
See application file for complete search history.

(56) References Cited

U.S. PATENT DOCUMENTS

| | | | |
|---|---|---|---|
| 5,584,946 A | 12/1996 | Karmaschek et al. | |
| 2004/0009300 A1 | 1/2004 | Shimakura et al. | |
| 2008/0233390 A1 | 9/2008 | Gothlich et al. | |
| 2009/0324839 A1* | 12/2009 | Klippel | C23C 22/20 427/419.2 |
| 2010/0224286 A1* | 9/2010 | Bertkau | B05C 1/0817 148/253 |
| 2014/0148337 A1* | 5/2014 | Schnabel | A01N 25/04 504/100 |
| 2020/0181778 A1 | 6/2020 | Sebralla et al. | |

FOREIGN PATENT DOCUMENTS

| | | |
|---|---|---|
| EP | 2098575 A1 | 9/2009 |
| FR | 2794464 B1 | 3/2005 |
| WO | 1994028193 A1 | 12/1994 |
| WO | 9630421 A1 | 10/1996 |
| WO | 9801478 A1 | 1/1998 |
| WO | 9858974 A1 | 12/1998 |
| WO | 9931144 A1 | 6/1999 |
| WO | 9935177 A1 | 7/1999 |
| WO | 9935178 A1 | 7/1999 |
| WO | 0075207 A1 | 12/2000 |
| WO | 0142312 A1 | 6/2001 |
| WO | 0226836 A2 | 6/2002 |
| WO | 2009050122 A1 | 4/2009 |
| WO | 2010100187 A1 | 9/2010 |
| WO | 2016096777 A1 | 6/2016 |
| WO | 2017046139 A1 | 3/2017 |

OTHER PUBLICATIONS

Matyjasqewski (Comparison and Classification of Controlled/Living Radical Polymerizations, ACS Symposium Series, ACS, 2000, pp. 1-25). (Year: 2000).*
International Search Report and Written Opinion for corresponding PCT/EP2018/074512, dated Nov. 13, 2018, 10 pages.

\* cited by examiner

*Primary Examiner* — Francisco W Tschen
(74) *Attorney, Agent, or Firm* — Armstrong Teasdale LLP

(57) ABSTRACT

Provided herein is a method for pretreating aluminum materials, particularly aluminum wheels, wherein an aluminum material is successively i) cleaned and subsequently rinsed, ii) optionally subjected to alkaline pickling and subsequently rinsed, iii) optionally contacted with an aqueous composition comprising at least one mineral acid, iv) optionally rinsed and v) contacted with an acidic aqueous composition comprising a) at least one compound selected from the group consisting of titanium, zirconium and hafnium compounds and b) at least one linear terpolymer prepared by controlled radical polymerisation and comprising vinylphosphonic acid monomeric units, hydroxylethyl- and/or hydroxylpropyl-(meth)acrylate monomeric units and (meth)acrylic acid monomeric units, vi) optionally rinsed, vii) optionally contacted with another aqueous composition, viii) optionally rinsed and ix) optionally dried. Further provided herein is a corresponding composition as well as the use of the materials treated according to the method.

26 Claims, No Drawings

METHOD FOR PRETREATING ALUMINUM MATERIALS, PARTICULARLY ALUMINUM WHEELS

CROSS-REFERENCE TO RELATED APPLICATIONS

This application is a U.S. National Phase application of PCT/EP2018/074512, filed Sep. 11, 2018, which claims the benefit of priority to European Application No. 17191077.1, filed Sep. 14, 2017, the contents of which are hereby expressly incorporated by reference in their entirety.

The present invention relates to a method for pretreating aluminum materials, particularly aluminum wheels, to a corresponding composition as well as the use of the materials treated according to the method.

Before aluminum materials such as wheels (often referred to as "alu rims") made from an aluminum alloy are being lacquered, they are nowadays typically subjected to an anti-corrosive and adhesion-promoting treatment with an aqueous solution based on titanium and/or zirconium complex fluoride, with such a solution based on compounds containing phosphonates or with a combination of both solutions in a two-step method. This pretreatment is generally preceded by pickling the aluminum material.

However, the conversion coating(s) produced hereby are not able to sufficiently limit so-called filiform corrosion.

This typically occurs in the form of finely running threads, e.g. on the borders of diamond turned (machined) surfaces (segments of the already conversion-coated and lacquered surfaces are turned mechanically) and following minor ruptures of the lacquered surfaces—in the case of wheels e.g. due to rock chips or damages on the curbside.

The present one-step pretreatments—with titanium and/or zirconium complex fluoride alone or with compounds containing phosphonates alone—do not deliver satisfying results.

Even the two-step variant of the procedure such as taught by EP 1 206 977 A2 wherein the aluminum surfaces are first treated with titanium and/or zirconium complex fluoride and then with at least one specific phosphonate is not sufficient for the industry's expectations.

The method taught in WO 2010/100,187 A1 for pretreating wheels made of an aluminum alloy is also a two-step method. Here, the wheels are first contacted with a compound containing silane and then with an aqueous composition containing at least one phosphonic compound wherein a polysiloxane and a phosphonate coating are being successively formed.

Indeed, the application of said method results in a reduced filiform corrosion. However, two- or multi-step methods involve greater expenses due to the increased expenditure of time, energy and labor and are therefore disadvantageous.

In numerous applications of aluminum materials, e.g. in wheels made of an aluminum alloy, it is also desired that the material's surface remains visible after lacquering. Accordingly, the material is then coated with a clear coat, i.e. a transparent lacquer. In order not to affect the material's visual appearance, a pretreatment, i.e. a coating achieved thereby, shall not be perceptible. However, many of such coatings are tarnished or show defects or runners.

Therefore, the object of the present invention is to provide a method for coating aluminum materials, particularly aluminum wheels, avoiding the disadvantages of the prior art and particularly resulting in good anti-corrosion and lacquer adhesion values at low costs and minor or no loss of gloss of the material's visual appearance.

The objective is achieved by a method of the invention for pretreating aluminum materials, particularly aluminum wheels, wherein an aluminum material is successively
i) cleaned and subsequently rinsed,
ii) optionally subjected to alkaline pickling and subsequently rinsed,
iii) optionally contacted with an aqueous composition comprising at least one mineral acid,
iv) optionally rinsed,
v) contacted with an acidic aqueous composition comprising
 a) at least one compound selected from the group consisting of titanium, zirconium and hafnium compounds and
 b) at least one copolymer soluble in the aqueous composition, said copolymer being a linear terpolymer prepared by controlled radical polymerisation and comprising:
  vinylphosphonic acid monomeric units m1 and
  hydroxyethyl- and/or hydroxypropyl-(meth)acrylate monomeric units m2 and
  (meth)acrylic acid monomeric units m3,
vi) optionally rinsed,
vii) optionally contacted with another acidic aqueous composition,
viii) optionally rinsed and
ix) optionally dried.

Definitions

In the present invention, an "aluminum material" is intended to mean a metallic surface containing aluminum or an aluminum alloy, wherein the latter contains more than 50 wt.-% of aluminum. Preferably, this metallic surface consists of aluminum or such an aluminum alloy, more preferably of such an aluminum alloy.

Said metallic surface may be the surface of a sheet, a part and/or a coil.

"Aluminum wheels" refers to wheels containing an aluminum material. The wheels can optionally be composite and possibly also be produced from different materials—not only from different aluminum materials. Even though those skilled in the art use the term "wheels", wheels commonly referred to as "alu rims" are meant. Thus, when "wheels" are mentioned below, alu rims—in common usage—are meant.

For the purpose of the present invention, an "aqueous composition" is also to be understood as such a solution containing, besides water as a solvent/dispersant, less than 50% by weight—with reference to the total amount of the solvents/dispersants—of other, organic solvents/dispersants.

In the present invention, the term "poly(meth)acrylic acid" represents polyacrylic acid, polymethacrylic acid, poly(acrylic-acid-co-methacrylic-acid) or a mixture of polyacrylic acid and polymethacrylic acid. In the case of monomeric units, "(meth)acrylic" accordingly represents acrylic and/or methacrylic. Likewise, the term "(meth)acrylate" refers to an acrylate, a methacrylate or a mixture of acrylate and methacrylate.

In the present invention, the term terpolymer comprising "monomeric units m1 and m2 and m3" refers to a copolymer resulting from the polymerization of only three kinds of monomers, namely:
 one or more kind(s) of monomer m1 and
 one or more kind(s) of monomer m2 and
 one or more kind(s) of monomer m3,
which encompasses terpolymers comprising only one kind of each monomeric units m1, m2, and m3, but also copolymers comprising different kinds of monomers units m1 and/or different kinds of monomers units m2 and/or different kinds of monomers units m3. A terpolymer as used according to the instant invention, made of monomeric units m1, m2, and m3, does not comprise any other monomer units. The terpolymer used in the instant invention may be a statistical or block copolymer.

Solubility of the inventively used terpolymer in the composition used in step v) of the inventive method is determined at a temperature of 20° C. and atmospheric pressure (1.013 bar).

With "complex fluorides," the single- or multiply-protonated forms, respectively, are also meant besides the deprotonated forms.

Regarding an organoalkoxysilane, organosilanole, polyorganosilanole, organosiloxane and/or polyorganosiloxane, "organo-" refers to at least one organic group directly linked to a silicon atom via a carbon atom and which therefore is not hydrolytically cleaved from it.

In the method according to the invention the aluminum material is i) cleaned and subsequently rinsed and then ii) optionally subjected to alkaline pickling and subsequently rinsed.

Step i) may also include a pickling. Especially in the field of aluminum finishing, i.e. for architectural construction elements made of aluminum or aluminum alloys in indoor and outdoor areas, a combination of cleaning and pickling in one step is preferred.

In optional step iii) of the method according to the invention, the aluminum material cleaned and optionally subjected to an alkaline pickling is contacted with an aqueous composition comprising at least one mineral acid and thus pickled. This mainly serves to remove aluminum oxide, undesired alloy components, the skin, brushing dust etc. from the material's surface and to thereby activate the surface for the subsequent conversion treatment in step v) of the method according to the invention. Especially in case of aluminum wheels it is preferred to perform step iii).

Preferably, the at least one mineral acid of the composition in step iii) is sulfuric acid and/or nitric acid, more preferably nitric acid.

The content of the at least one mineral acid is preferably in the range of 1.5 to 50 g/l, more preferably of 2 to 20 g/l and most preferably of 3 to 10 g/l, calculated as sulfuric acid.

The composition in step iii) preferably additionally comprises a titanium and/or zirconium compound, more preferably a titanium compound.

The content of the titanium and/or zirconium compound is preferably in the range of 0.005 to 5 g/l, more preferably of 0.007 to 0.5 g/l and most preferably of 0.01 to 0.3 g/l, calculated as titanium and/or zirconium.

In the treatment of parts, such as for example wheels, the duration of treatment with the composition in step iii) is preferably in the range of 30 seconds to 10 minutes, more preferably of 40 seconds to 6 minutes and most preferably of 45 seconds to 4 minutes. The treatment temperature is preferably in the range of 20 to 55° C., more preferably of 25 to 50° C. and most preferably of 30 to 45° C.

In the treatment of coils, the duration of treatment is preferably in the range of 3 seconds to 1 minute, most preferably of 5 to 20 seconds.

The aluminum material optionally rinsed following treatment with the composition in step iii)—see step iv), preferably rinsed with deionized water—is contacted with an acidic aqueous composition in step v) comprising a) at least one compound selected from the group consisting of titanium, zirconium and hafnium compounds and b) at least one copolymer soluble in the aqueous composition, said copolymer being a linear terpolymer comprising vinylphosphonic acid monomeric units m1, hydroxyethyl- and/or hydroxypropyl-(meth)acrylate monomeric units m2 and (meth)acrylic acid monomeric units m3.

The pH value of the composition in step v) is preferably in the range of 0.5 to 6.9, more preferably of 2.0 to 6.0, even more preferably of 2.5 to 5.5 and most preferably of 3.5 to 5.4. The pH value is preferably adjusted with nitric acid and/or ammonia.

Preferably, in the composition in step v), the concentration of component a) is in the range of 0.005 to 5 g/l, calculated as metal (i.e. as titanium, zirconium and/or hafnium), and the concentration of component b) is in the range of 0.002 to 2 g/l, calculated as solid addition.

The concentration of a) is preferably in the range of 0.007 to 3 g/l, more preferably of 0.01 to 1 g/l, more preferably of 0.015 to 0.5 g/l, even more preferably of 0.02 to 0.35 g/l, calculated as metal.

The concentration of b) is preferably in the range of 0.004 to 1.8 g/l, more preferably of 0.007 to 1.5 g/l, more preferably of 0.01 to 1 g/l, even more preferably of 0.015 to 0.75 g/l, calculated as solid addition.

In a particularly preferred embodiment, the concentration of a) is in the range of 0.015 to 0.5 g/l, and that of b) in the range of 0.01 to 1 g/l.

In an even more preferred embodiment, the concentration of a) is in the range of 0.02 to 0.35 g/l, and that of b) is in the range of 0.015 to 0.75 g/l.

The content of component a) as well as of the optional additional components c) and d) (see discussions below) can be monitored during the aluminum material's treatment by the means of ICP-OES (optical emission spectroscopy with inductively coupled plasma) or approximately photometrically such that optionally, an additional dosage of single or multiple of these components can be carried out.

Component a) of the composition in step v) is preferably at least one complex fluoride selected from the group consisting of complex fluorides of titanium, zirconium and hafnium.

Here, zirconium complex fluoride is more preferred. Thereby, zirconium can also be added as zirconyl nitrate, zirconyl acetate or zirconium nitrate, preferably as zirconyl nitrate. Accordingly, this also applies to titanium and hafnium.

In a preferred embodiment, the composition contains at least two different complex fluorides and more preferably titanium and zirconium complex fluoride.

According to a preferred embodiment, component b) of the composition in step v) includes at least one copolymer, which is a terpolymer that contains vinylphosphonic acid monomeric units m1, present in the copolymer at a molar content of 5 to 50% based on the whole copolymer and hydroxyethyl- and/or hydroxypropyl-(meth)acrylate monomeric units m2, which are present in the copolymer at a molar content of 5 to 70%, typically 20 to 55%, preferably 40 to 50% based on the whole copolymer and (meth)acrylic acid monomeric units m3, which are present in the copolymer at a molar content of 25 to 85%, typically 40 to 70%, for example 45 to 60% based on the whole copolymer.

According to a specific embodiment, the at least one copolymer of component b) of the composition in step v) is a terpolymer that contains 2-hydroxyethyl-(meth)acrylate and/or hydroxypropyl-(meth)acrylate, wherein the latter is 2-hydroxypropyl-(meth)acrylate, 3-hydroxypropyl-(meth)

acrylate or a mixture of 2-hydroxypropyl-(meth)acrylate and 3-hydroxypropyl-(meth)acrylate, as monomeric units m2.

According to a first especially preferred embodiment the at least one copolymer is a terpolymer that contains 2-hydroxyethyl-(meth)acrylate, especially 2-hydroxyethyl-acrylate as monomeric units m2. Such copolymers are especially suitable in the field of aluminum finishing, as in this field aluminum alloys with a low content of silicon are commonly used.

According to a second especially preferred embodiment the at least one copolymer is a terpolymer that contains hydroxypropyl-(meth)acrylate, especially a mixture of 2-hydroxypropyl-acrylate and 3-hydroxypropyl-acrylate, as monomeric units m2. Such copolymers are especially suitable for the application on aluminum wheels, as in case of aluminum wheels aluminum alloys with a high content of silicon are commonly used.

As an illustrative example, a terpolymer especially useful according to the instant invention is a terpolymer obtained by a controlled radical polymerization of a monomer mixture consisting of 6% mol of vinylphosphonic acid; 46.3% of hydroxypropyl and acrylate 47.3% of acrylic acid, having a number averaged molecular weight Mn between 12,000 and 15,500 and a weight averaged molecular weight Mw between 21,000 and 25,000. Such a polymer may be prepared by a controlled radical polymerization using O-ethyl S-(1-(methoxycarbonyl)ethyl) xanthate as a control agent as defined below, according to the process described for example in WO 98/58974.

In any case, the at least one copolymer of component b) in the composition of step v) is a terpolymer that preferably has a degree of polymerization in the range of 30 to 500, more preferably of 40 to 480 and most preferably of 55 to 400. Its number averaged molecular weight Mn is preferably in the range of 5,000 to 60,000 g/mol, more preferably of 10,000 to 50,000 g/mol, more preferably of 10,000 to 47,000 g/mol and most preferably of 10,000 to 42,000 g/mol. The number average number and weight molecular weight (respectively) Mn and Mw as referred in the instant description may be measured according to the following protocol:

Samples are analyzed by SEC equipped with a MALS detector. Absolute molar masses are obtained with a dn/dC value chosen equal to 0.1875 mL/g in order to get a recovery mass around 90%.

Polymer samples are dissolved in the mobile phase and the resulting samples are filtrated with a Millipore filter 0.45 μm.

Eluting conditions are the following ones:
mobile phase: H2O 100% vol. 0.1 M NaCl, 25 mM NaH2PO4, 25 mM Na2HPO4; 100 ppm NaN3
flow rate: 1 mL/min
columns: Varian Aquagel OH mixed H, 8 μm, 3*30 cm
detection: RI (concentration detector Agilent)+MALLS (MultiAngle Laser Light Scattering) Mini Dawn Tristar+UV at 290 nm.
samples concentration: around 0.5 wt % in the mobile phase
injection loop: 100 μL.

According to a particularly preferred embodiment, component b) of the composition in step v) includes at least one copolymer selected from the group consisting of (meth)acrylic acid-hydroxyethyl(meth)acrylate-vinylphosphonic acid-terpolymers, (meth)acrylic acid-hydroxypropyl(meth)acrylate-vinylphosphonic acid-terpolymers and (meth)acrylic acid-N,N-dimethyl-(meth)acrylate-vinylphosphonic acid-terpolymers, each preferably having a number averaged molecular weight in the range of 10,000 to 42,000 g/mol.

According to another particularly preferred embodiment, the composition in step v) additionally contains poly(meth)acrylic acid having a number averaged molecular weight of at least 28,000 g/mol.

Preferably, the poly(meth)acrylic acid then has a number averaged molecular weight in the range of 20,000 to 100,000 g/mol, more preferably of 25,000 to 75,000 g/mol, even more preferably of 28,000 to 75,000 g/mol and most preferably of 28,000 to 60,000 g/mol.

In view of the coatings to be deposited onto the aluminum material, the polymeric components of such a mixture exhibit excellent compatibility, i.e. there is no precipitation—neither of the copolymer b) nor of the poly(meth)acrylic acid—, no clouding and no phase separation.

The at least one copolymer of component b) in the composition in step v) (in the following often referred to as "copolymer b)") may be a block or statistical copolymer made of the monomeric units m1, m2 and m3, typically a statistical copolymer.

Besides, it is specifically a copolymer obtained by a controlled radical polymerization of monomers m1, m2 and m3, said polymerization being carried out continuously or batchwise. According to a specific embodiment the at least one copolymer used as the component b) in step v is a statistical copolymer obtained by a controlled radical copolymerization of monomers m1, m2 and m3, namely a copolymer obtained by contacting the monomers m1, m2 and m3, a free radical source and a radical polymerization control agent.

In the present description, the term "radical polymerization control agent" (or more concisely "control agent") refers to a compound which is capable of extending the lifetime of the growing polymer chains in a radical polymerization reaction and of conferring, on the polymerization, a living or controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

According to an advantageous embodiment, the radical polymerization control agent used for preparing the copolymer b) is a compound which comprises a thiocarbonylthio group —S(C=S)—. Thus, for example, it may be a compound which comprises at least one xanthate group (bearing —SC=S—O— functions), for example one or two xanthates. According to one embodiment, the compound comprises several xanthates. Other types of control agent may be envisaged (for example of the type used in ATRP (Atom Transfer Radical Polymerization or NMP (Nitroxide-mediated Polymerization)).

Typically, the control agent is a non-polymer compound bearing a group that ensures control of the radical polymerization, especially a thiocarbonylthio group —S(C=S)—. According to a more specific variant, the radical polymerization control agent is a polymer, advantageously an oligomer and bearing a thiocarbonylthio —S(C=S)— group, for example a xanthate —SC=S—O— group, typically obtained by a radical polymerization monomers in the presence of a control agent bearing a thiocarbonylthio —S(C=S)— group, for example a xanthate.

A suitable control agent may, for example, have to formula (A) below:

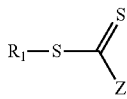

wherein:
Z represents:
   a hydrogen atom,
   a chlorine atom,
   an optionally substituted alkyl or optionally substituted aryl radical,
   an optionally substituted heterocycle,
   an optionally substituted alkyl thio radical,
   an optionally substituted aryl thio radical,
   an optionally substituted alkoxy radical,
   an optionally substituted aryloxy radical,
   an optionally substituted amino radical,
   an optionally substituted hydrazine radical,
   an optionally substituted alkoxycarbonyl radical,
   an optionally substituted aryloxycarbonyl radical,
   an optionally substituted acyloxy or carboxyl radical,
   an optionally substituted aroyloxy radical,
   an optionally substituted carbamoyl radical,
   a cyano radical,
   a dialkyl- or diarylphosphonato radical,
   a dialkyl-phosphinato or diaryl-phosphinato radical, or
   a polymer chain,
and
$R_1$ represents:
   an optionally substituted alkyl, acyl, aryl, aralkyl, alkenyl or alkynyl group,
   a saturated or unsaturated, aromatic, optionally substituted carbocycle or heterocycle, or
   a polymer chain, which is preferably hydrophilic or water-dispersible.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The group $R_1$ may alternatively be amphiphilic, i.e. it may have both hydrophilic and lipophilic nature. It is preferable for $R_1$ not to be hydrophobic.

$R_1$ may typically be a substituted or unsubstituted, preferably substituted, alkyl group. A control agent of formula (A) may nevertheless comprise other types of groups $R_1$, in particular a ring or a polymer chain.

The optionally substituted alkyl, acyl, aryl, aralkyl or alkyne groups generally bear from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they bear at least one acetylenic unsaturation, such as the acetylenyl radical.

The acyl group is a radical generally bearing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain, this polymer chain may result from a radical or ionic polymerization or from a polycondensation.

Advantageously, the control agent is selected from compounds bearing a xanthate —S(C=S)O—, trithiocarbonate, dithiocarbamate or dithiocarbazate function, for example compounds bearing an O-ethyl xanthate function of formula —S(C=S)OCH$_2$CH$_3$. Xanthates prove to be very particularly advantageous, in particular those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt.

By the addition of a copolymer b) employed according to the invention, the properties of the conversion coatings formed by the pretreatment, particularly the ability to serve as adhesion promoters for further coatings, can be significantly improved.

During the treatment of the metallic surface with an acidic aqueous composition, a pickling of the surface and as a consequence the forming of a pH gradient with increasing pH values towards the surface occurs.

The copolymer contains acid groups which dissociate at least partially with the pH value increased at the surface. This leads to negative charges at the copolymer which in turn lead to an electrostatic accumulation of the copolymer to the metallic surface.

The properties of the formed coatings are thus being improved, particularly the adhesion to the upper lacquer coating. However, it is important here that the accumulation of the copolymer does not lead to the pickling attack of the metallic surface being reduced in such an amount that the pH gradient can only develop insufficiently or not at all—as is the case in the polymers used in the prior art.

The composition in step v) of the method according to the invention preferably additionally comprises a component c). This component c) is at least one compound selected from the group consisting of organoalkoxysilanes, organosilanoles, polyorganosilanoles, organosiloxanes and polyorganosiloxanes preferably having a concentration in the range of 1 to 750 mg/l, calculated as silicon.

The concentration of c) is more preferably in the range of 5 to 500 mg/l, even more preferably of 15 to 250 mg/l and most preferably of 17 to 45 mg/l, calculated as silicon.

Preferably, this component c) is then at least one organoalkoxysilane, organosilanole, polyorganosilanole, organosiloxane and/or polyorganosiloxane each comprising at least one amino group, urea group, imido group, imino group and/or ureido group per organoalkoxysilane/organosilanole unit.

More preferably, said component c) is at least one organoalkoxysilane, organosilanole, polyorganosilanole, organosiloxane and/or polyorganosiloxane each having at least one, particularly one to two amino groups per organoalkoxysilane/organosilanole unit. Particularly preferred is 2-amino-ethyl-3-amino-propyltrimethoxysilane, 2-aminoethyl-3-amino-propyltriethoxysilane, bis(tri-methoxysilylpropyl)amine or bis(triethoxysilyl-propyl)amine or a combination of these as the organoalkoxysilane/organosilanole unit.

Particularly preferred is 2-aminoethyl-3-amino-propyltrimethoxysilane or bis(tri-methoxysilylpropyl)amine or a combination of both as the organoalkoxysilane/organosilanole unit.

For the purpose of this invention, polyorganosiloxanes are understood as such compounds being able to be formed with at least one organosiloxane, wherein no polydimethylsiloxane is added, and which are no silicones.

The composition in step v) of the method according to the invention preferably additionally comprises a component d). This component d) is at least one type of cation selected from the group consisting of cations of the metals of the groups IA, IIA, IIIA, VB; VIB and VIIB of the periodic system of the elements, of lanthanides as well as of bismuth and of tin and/or at least one corresponding compound.

According to a preferred embodiment, said component d) of the composition in step v) is at least one type of cation selected from the group consisting of the cations of cerium and other lanthanides, chromium, calcium, magnesium, manganese, niobium, tantalum, lithium, bismuth and tin, more preferably of manganese, lithium and zinc. Particularly preferably, they are manganese cations in the +II oxidation state or lithium cations.

As such, it has surprisingly been found that the presence of lithium cations in the composition of step v) leads to a further reduction of the filiform corrosion.

In the preferred embodiment mentioned above, the concentration of d) is preferably in the range of 1 to 950 mg/l, more preferably of 5 to 700 mg/l, even more preferably of 15 to 500 mg/l and is most preferably in the range of 17 to 350 mg/l, calculated as the sum of the metals.

According to a further preferred embodiment, component d) of the composition in step v) is at least one molybdenum and/or vanadium compound, preferably at least one molybdenum compound, having a concentration in the range of 1 to 400 mg/l, more preferably of 2 to 300 mg/l and most preferably of 4 to 75 mg/l, calculated as metal.

According to a particularly preferred embodiment, the composition in step v) contains at least one compound selected from the group consisting of titanium, zirconium and hafnium compounds and a molybdenum compound in a weight ratio (calculated as Zr—/Mo-metal) of Zr:Mo from 15:1 to 3.5:1, preferably from 13:1 to 7:1.

The composition in step v) of the method of the invention preferably additionally comprises a component e) which is at least one compound selected from the group consisting of substances affecting the pH value, organic solvents, water-soluble fluorine compounds and nanoparticles, preferably having a concentration ranging from 0.1 to 20 g/l.

The substances affecting the pH value are preferably selected from the group consisting of nitric acid, sulfuric acid, acetic acid, hydrofluoric acid, ammonium/ammonia and sodium hydroxide. Here, nitric acid and/or ammonium are more preferred.

The organic solvents are preferably selected from the group consisting of methanol and ethanol. Thus, in practice, in the case of the presence of a component c), methanol and/or ethanol are present as reaction products of the organoalkoxysilane-hydrolysis in the composition in step v).

The water-soluble fluorine compounds are preferably selected from the group consisting of compounds containing fluoride and fluoride anions.

In the composition in step v), the total fluoride content is preferably in the range of 1.5 to 500 mg/l.

Indeed, free fluoride is particularly advantageous for the initiation of the conversion coating formation, however, it has adverse effects on the coating's adhesion. Thus, the free fluoride content is preferably in the range of 1 to 250 mg/l, more preferably of 3 to 100 mg/l and most preferably of 5 to 100 mg/l.

At that, the free fluoride content is determined by means of a fluoride electrode.

The nanoparticles preferably are metal oxide particles, more preferably metal oxide particles selected from the group consisting of $ZnO$, $SiO_2$, $CeO_2$, $ZrO_2$ and $TiO_2$.

The composition in step v) preferably contains ammonium ions and/or corresponding compounds.

The composition in step v) can additionally contain compounds containing phosphorus and oxygen such as phosphates and/or phosphonates. Also, it can comprise nitrate.

However, the content of compounds containing sulfur, particularly sulfate, as well as nitrite should preferably be kept as low as possible. More preferably, the content of compounds containing sulfur is less than 100 mg/l, calculated as sulfur. More preferably, the content of nitrite is less than 5 mg/l.

The aluminum material to be treated can be sprayed with the composition in step v), immersed into it or flooded with it. It is also possible to apply the composition manually by wiping or brushing or with rolls or rollers (coil coating method) onto the material to be treated. An electrolytic deposition of the composition on the material to be treated is also possible.

In the treatment of parts, such as for example wheels, the duration of treatment is preferably in the range of 15 seconds to 10 minutes, more preferably of 30 seconds to 5 minutes and most preferably of 45 seconds to 1 minute. The treatment temperature is preferably in the range of 5 to 50° C., more preferably of 15 to 40° C. and most preferably of 30 to 35° C.

The method of the invention is also suitable for the coating of coils. Herein, the treatment duration is preferably in the range of a few seconds to several minutes, such as of 1 to 300 seconds.

After step v) of the method according to the invention the aluminum material is vi) optionally rinsed, vii) optionally contacted with another aqueous composition, viii) optionally rinsed and ix) optionally dried.

Because the rinsing steps vi) and viii) before the drying step ix) are not mandatory, so-called "no-rinse" variants are comprised by the method according to the invention as well.

However, rinsing steps vi) and viii) may be carried out in order to remove excess components such as for example the copolymer from component b) in step v), the copolymer from step vii) and/or disruptive ions from the aluminum material or the post-rinse composition of step vii).

Because the drying step ix) is not mandatory, so-called "wet-on-wet" variants are comprised by the method according to the invention as well. A wet-on-wet method may especially be advantageous in case of an (electrophoretic) dip paint being applied as a lacquer (see below).

The aqueous composition applied in step vii) of the method according to the invention may for example be another composition according to step v), i.e. a composition, which is different from the composition used in step v), or a post-rinse composition containing e.g. certain metal ions and/or (co-)polymers.

In a preferred embodiment, the aluminum material is vi) rinsed, preferably with deionized water and vii) contacted with an aqueous composition containing at least one linear terpolymer prepared by controlled radical polymerisation and comprising vinylphosphonic acid monomeric units m1,
hydroxyethyl- and/or hydroxypropyl-(meth)acrylate monomeric units m2 and
(meth)acrylic acid monomeric units m3, wherein step viii) is omitted.

At that, the at least one copolymers applied in step v) and step vii) may be the same.

Said preferred embodiment is especially advantageous in case of aluminum wheels and results in a remarkable further improvement of anti-corrosion and lacquer adhesion values.

The method of the invention is suitable for all aluminum alloys containing more than 50 wt.-% aluminum, particularly for aluminum magnesium alloys, including, but not limited to AA5005, as well as for aluminum magnesium silicon alloys, including, but not limited to AA6060 and AA6063, for cast alloys—e.g. AlSi7Mg, AlSi9Mg, AlSi10Mg, AlSi11Mg, AlSi12Mg—as well as for forge alloys—e.g. AlSiMg. However, it is principally suited for all alloys of the so-called AA1000, AA2000, AA3000, AA4000, AA5000, AA6000, AA7000 as well as AA8000 series.

Aluminum magnesium alloys, including AA5005, as well as aluminum magnesium silicon alloys, including AA6060 and AA6063, are commonly used in the field of aluminum finishing, whereas cast alloys—e.g. AlSi7Mg, AlSi9Mg, AlSi10Mg, AlSi11Mg, AlSi12Mg—as well as forge alloys—e.g. AlSiMg—are commonly used for the production of aluminum wheels.

The method of the invention is also suitable for anodized metallic surfaces, i.e. metallic surfaces containing anodized aluminum or an anodized aluminum alloy, wherein the latter contains more than 50 wt.-% of aluminum.

With the method of the invention, a mixture of different metallic materials can be treated in the same bath (so-called "multi-metal capacity").

The coatings formed in the method of the invention preferably have a coating weight determined by XRF (X-ray fluorescence spectroscopy) of:

i) 0.5 to 200, more preferably 2 to 50 and most preferably 3 to 40 mg/m$^2$, referred only to component a), calculated as zirconium, and/or optionally
ii) 0.01 to 50, more preferably 0.05 to 40 and most preferably 0.1 to 20 mg/m$^2$, referred only to component b), calculated as phosphorus, and/or optionally
iii) 0.1 to 50, more preferably 1 to 40 and most preferably 2 to 20 mg/m$^2$, referred only to component c), calculated as silicon.

The coatings produced with the method of the invention serve as corrosion protection and adhesion promoter for further coatings.

This way, they can easily be further coated with at least one primer, lacquer, particularly a transparent lacquer, adhesive and/or lacquer-like organic composition. Thereby, preferably at least one of these further coatings can be cured by heating and/or irradiation.

As a lacquer, a powder paint, e.g. on the basis of polyester and/or epoxy resin or polyacrylate or PVDF, a liquid paint, e.g. on the basis of a polyacrylate dispersion or PVDF, a dip paint or an electrophoretic dip paint—cathodic or anodic—can be applied.

The present invention also relates to an acidic aqueous composition according to step v), comprising
a) at least one compound selected from the group consisting of titanium, zirconium and hafnium compounds and
b) at least one linear terpolymer prepared by controlled radical polymerisation and comprising
vinylphosphonic acid monomeric units m1,
hydroxyethyl- and/or hydroxypropyl-(meth)acrylate monomeric units m2 and
(meth)acrylic acid monomeric units m3.

Preferably, this composition of the invention additionally comprises one or more preferred features—as discussed above.

The present invention also relates to a concentrate from which a bath for the treatment of the aluminum material, i.e. with the composition of the invention above, can be prepared by diluting and optionally adjusting the pH value.

The concentrate comprises the following contents for components a) and b) and—if present—c) and d):

The concentration of a) is preferably in the range of 0.5 to 100 g/l, calculated as zirconium.
The concentration of b) is preferably in the range of 0.1 to 500 g/l, calculated as solid addition.
The concentration of c) is preferably in the range of 0.05 to 10 g/l, calculated as silicon.
The concentration of d) is preferably in the range of 0.01 to 50 g/l, calculated as the sum of the metals.

In a particularly preferred embodiment, the concentration of a) is in the range of 0.5 to 75 g/l, that of b) in the range of 0.1 to 300 g/l, that of c) in the range of 0.05 to 5 g/l and that of d) in the range of 0.01 to 20 g/l.

For component e), if present, the concentrate preferably has a content in the range of 0.01 to 20 g/l.

The concentrate preferably has a pH value in the range of 0.5 to 6.5, more preferably of 1.5 to 5.5 and most preferably of 1.9 to 4.9.

The treatment bath containing the composition of the invention can be obtained by diluting the concentrate with water, an aqueous solution and/or a suitable organic solvent, preferably by the factor 1:5,000 to 1:10, more preferably 1:3,000 to 1:10, even more preferably 1:2,000 to 1:10 and most preferably by the factor of about 1:1,000.

Moreover, the present invention relates to a conversion-coated aluminum material obtainable by the method according to the invention as well.

Finally, the invention relates to the use of aluminum materials treated with the method of the invention in automotive construction, vehicle construction, aircraft construction and facade construction, particularly for wheels, edgings and other mounting parts, cans, beverage cans, tubes, films, profiles and housings.

The invention also relates to the use of aluminum materials treated with the method of the invention in the field of aluminum finishing, i.e. for architectural construction elements made of aluminum or aluminum alloys in indoor and outdoor areas, in particular in window, facade and roof construction.

Test Methods

1. Determination of Average Molecular Weights $M_w$ and $M_n$

The number average and weight average molecular weights ($M_n$ and $M_w$), respectively, are measured according to the following protocol: Samples are analyzed by SEC (size exclusion chromatography) equipped with a MALS detector. Absolute molar masses are obtained with a dn/dC value chosen equal to 0.1875 mL/g in order to get a recovery mass around 90%. Polymer samples are dissolved in the mobile phase and the resulting solutions are filtrated with a Millipore filter 0.45 μm. Eluting conditions are the following ones. Mobile phase: $H_2O$ 100% vol. 0.1 M NaCl, 25 mM $NaH_2PO_4$, 25 mM $Na_2HPO_4$; 100 ppm $NaN_3$; flow rate: 1 mL/min; columns: Varian Aquagel OH mixed H, 8 μm, 3*30 cm; detection: RI (concentration detector Agilent)+MALLS (MultiAngle Laser Light Scattering) Mini Dawn Tristar+UV at 290 nm; samples concentration: around 0.5 wt % in the mobile phase; injection loop: 100 μL.

2. ICP-OES

The amount of certain elements in a sample under analysis, such as of titanium, zirconium and hafnium, being present in component a), is determined using inductively coupled plasma atomic emission spectrometry (ICP-OES) according to DIN EN ISO 11885 (date: Sep. 1, 2009). A sample is subjected to thermal excitation in an argon plasma generated by a high-frequency field, and the light emitted due to electron transitions becomes visible as a spectral line of the corresponding wavelength and is analyzed using an optical system. There is a linear relation between the intensity of the light emitted and the concentration of the element in question, such as titanium, zirconium and/or hafnium. Prior to implementation, using known element standards (reference standards), the calibration measurements are carried out as a function of the particular sample under analysis. These calibrations can be used to determine concentrations of unknown solutions such as the concentration of the amount of titanium, zirconium and hafnium.

3. Crosscut Testing to DIN EN ISO 2409 (06-2013)

The crosscut test is used to ascertain the strength of adhesion of a coating on a substrate in accordance with DIN EN ISO 2409 (06-2013). Cutter spacing is 2 mm. Assessment takes place on the basis of characteristic cross-cut values in the range from 0 (very good adhesion) to 5 (very poor adhesion). The crosscut test may also be performed after exposure for up to 240 hours in a condensation clima according to DIN EN ISO 6270-2 CH (09-2005 and the correction of 10-2007) or storing the sample for 48 h in water having a temperature of 63° C. in order to determine the wet adhesion. Each of the tests is performed three times and an average value is determined.

4. Copper Catalyzed Acetic Acid Salt Spray (CASS) Mist Testing to DIN EN ISO 9227 (09-2012)

The copper catalyzed acetic acid salt spray fog test is used for determining the corrosion resistance of a coating on a substrate. In accordance with DIN EN ISO 9227 (09-2012) the samples under analysis are in a chamber in which there is continuous misting of a 5% strength common salt solution, the salt solution being admixed with acetic acid and copper chloride, at a temperature of 50° C. for a duration of 240 hours, respectively, with controlled pH. The spray mist deposits on the samples under analysis, covering them with a corrosive film of salt water. If, still prior to the CASS mist testing, the coating on the samples for investigation is scored down to the substrate with a blade incision, the samples can be investigated for their level of under-film corrosion in accordance with DIN EN ISO 4628-8 (03-2013), since the substrate corrodes along the score line during the CASS fog test. As a result of the progressive process of corrosion, the coating is undermined to a greater or lesser extent during the test. The extent of undermining in [mm] is a measure of the resistance of the coating. Assessment may also be placed on the basis of characteristic values in the range from 0 (no under-film corrosion) to 5 (significant corrosion). Each of the tests is performed three times and an average value is determined.

5. Filiform Corrosion (FFC)

Determining the filiform corrosion is used to ascertain the corrosion resistance of a coating on a substrate. This determination is carried out according to MBN 10494-6, 5.5 (DBL 7381) over a duration of 672 hours. The maximum thread length (LF) and the average undermining (MU) in [mm] is measured.

EXAMPLES

The following examples further illustrate the invention but are not to be construed as limiting its scope.

1. Acidic Aqueous Compositions 1.1 Polymer (P1) as component b) has been used, which is a terpolymer obtained by a controlled radical polymerization of a monomer mixture consisting of 4 to 25 mole-% of vinylphosphonic acid, 30 to 60 mole-% of hydroxypropyl (meth)acrylate and 30 to 60 mole-% of (meth)acrylic acid, wherein the sum of all monomeric units present in polymer (P1) adds up to 100 mole-%, having a number averaged molecular weight $M_n$ between 12,000 and 15,500 and a weight averaged molecular weight $M_w$ between 21,000 and 25,000. The polymer (P1) is prepared by a controlled radical polymerization using O-ethyl S-(1-(methoxycarbonyl)ethyl) xanthate as a control agent.

1.2 A number of aqueous solutions (each made by use of deionized water) containing an amount in the range of from 0.75 to 5.5 g/L of the commercially available product Gardobond® X 4707 (available from Chemetall GmbH) or containing an amount in the range of from 0.75 to 5.5 g/L of the commercially available product Gardobond® X 4742 (available from Chemetall GmbH) have been placed in a beaker. Gardobond® X 4707 is an acidic aqueous solution, which contains titanium compounds and zirconium compounds as component a). Gardobond® X 4742 is an acidic aqueous solution, which contains zirconium compounds as component a).

To the above mentioned aqueous solution containing Gardobond® X 4707 an aqueous solution of polymer (P1) containing (P1) has been added in different amounts ranging from 0.1 g/L to 10 g/L.

To the above mentioned aqueous solution containing Gardobond® X 4742 an aqueous solution of polymer (P1) containing (P1) has been added in different amounts ranging from 0.1 g/L to 10 g/L.

1.3 A further series of aqueous solutions (each made by use of deionized water) have been prepared from Oxsilan® 9801 and Oxsilan® additive 9900. Oxsilan® 9801 and Oxsilan® additive 9900 are commercial products available from Chemetall GmbH.

To the above mentioned aqueous solutions an aqueous solution of polymer (P1) containing (P1) has been added in different amounts ranging from 0.1 g/L to 10 g/L.

1.4 A number of further comparative aqueous solutions (each made by use of deionized water) containing an amount in the range of from 0.75 to 5.5 g/L of the commercially available product Gardobond® X 4742 (available from Chemetall GmbH) have been placed in a beaker. To the above mentioned aqueous solution containing Gardobond® X 4742 an aqueous solution of a commercially available poly(meth)acrylic acid has been added in different amounts ranging from 0.1 g/L to 10 g/L.

2. Inventive Method 2.1 Aluminum wheels (AlSi7) have been used as substrate, which are available from the company Ronal (Switzerland).

In a cleaning step i) these substrates have been cleaned by making use of the commercial product Gardoclean® S 5086 (Chemetall GmbH) (60° C., 10 minutes) followed by treatment with a mineral acid in a step iii). The treatment was performed by making use of one of the commercial products Gardacid® P 4325 (Chemetall GmbH) or Gardobond® X4717 (Chemetall GmbH) (90 seconds). After performance of step iii) rinsing with tap water is performed in a step iv) (30 seconds).

2.2 After performance of the steps as outlined in item 2.1, contacting step v) is carried out, i.e. the surfaces of the substrates are contacted with an inventive or comparative acidic composition in order to form a conversion coating layer on the substrate. The contacting step is performed for 45 seconds.

After having performed said contacting step v) the resulting substrate bearing a conversion coating layer due to carrying out the contacting step is subjected to a rinsing step vi) with deionized water.

Following the rinsing step a drying step ix) is performed (10 minutes at 80° C.). Afterwards, at least one further coating layer is applied onto the substrates. In alternative 1) a polyester powder coating (commercial product PT1005BR999F, available from the company Freilacke; in the following referred to as "PE") is first applied onto the substrate, curing is performed at 180° C. and then an acrylic clear coating composition (commercial product K01853LRA999, available from the company Freilacke; in the following referred to as "AC1") is applied onto the cured PE coat. Curing is performed at 190° C. In alternative 2) a commercial powder coating (commercial product PO1857BR999A, available from the company Freilacke; in the following referred to as "KSP") is first applied onto the substrate, curing is performed at 180° C. and then an acrylic clear coating composition (commercial product KO1853LRA999, available from the company Freilacke; in the following referred to as "AC1") is applied onto the cured KSP coat. Curing is performed at 190° C. In alternative 3) a commercial clear coating composition (commercial product PY1005, available from the company Freilacke; in the following referred to as "AC2") is applied onto the substrate and curing is performed at 200° C. The dry layer thicknesses of these coatings obtained are in the range of 10-120 μm.

2.3 The experiments performed are summarized in the following Tables 1, 2 and 3 as well as 4:

TABLE 1

Experiments of Series 1

| No. | Product used in step (iii) | Aqueous acidic composition used in step (v) | Further coating applied according to alternative 1), 2) or 3) |
|---|---|---|---|
| B1a | Gardacid ® P 4325 | Gardobond ® X 4707 (5 g/L) + aq. solution of polymer (P1) (1 g/L) | alternative 1) |
| B1b | Gardacid ® P 4325 | Gardobond ® X 4707 (5 g/L) + aq. solution of polymer (P1) (1 g/L) | alternative 2) |
| B1c | Gardobond ® X 4717 | Gardobond ® X 4707 (5 g/L) + aq. solution of polymer (P1) (1 g/L) | alternative 1) |
| B1d | Gardobond ® X 4717 | Gardobond ® X 4707 (5 g/L) + aq. solution of polymer (P1) (1 g/L) | alternative 2) |

TABLE 2

Experiments of Series 2

| No. | Product used in step (iii) | Aqueous acidic composition used in step (v) | Further coating applied according to alternative 1), 2) or 3) |
|---|---|---|---|
| B2a | Gardacid ® P 4325 | Gardobond ® X 4742 (0.75 g/L) + aq. solution of polymer (P1) (1 g/L) | alternative 1) |
| B2b | Gardacid ® P 4325 | Gardobond ® X 4742 (0.75 g/L) + aq. solution of polymer (P1) (1 g/L) | alternative 2) |
| B2c | Gardobond ® X 4717 | Gardobond ® X 4742 (0.75 g/L) + aq. solution of polymer (P1) (2 g/L) | alternative 1) |
| B2d | Gardobond ® X 4717 | Gardobond ® X 4742 (0.75 g/L) + aq. solution of polymer (P1) (2 g/L) | alternative 2) |

TABLE 3

Experiments of Series 3

| No. | Product used in step (iii) | Aqueous acidic composition used in step (v) | Further coating applied according to alternative 1), 2) or 3) |
|---|---|---|---|
| B3a | Gardacid ® P 4325 | Oxsilan ® 9801 (5.5 g/L) + Oxsilan ® additive 9900 (4.5 g/L) + aq. solution of polymer (P1) (2.0 g/L) | alternative 3) |
| B3b | Gardacid ® P 4325 | Oxsilan ® 9801 (5.5 g/L) + Oxsilan ® additive 9900 (4.5 g/L) + aq. solution of polymer (P1) (2.0 g/L) | alternative 3) |

TABLE 4

Experiments of Series 4

| No. | Product used in step (iii) | Aqueous acidic composition used in step (v) | Further coating applied after drying step ix) |
|---|---|---|---|
| C1a | Gardacid ® P 4325 | Gardobond ® X 4742 (0.75 g/L) + aq. solution of poly(meth)acrylic acid (1 g/L) | alternative 3) |

3. Properties of the Coated Substrates 3.1 A number of properties of the coated substrates obtained by the inventive method described in item 2. has been investigated. These properties were determined according to the test methods described hereinbefore. The results are displayed in the Tables below.

TABLE 4a

| Example no. | Crosscut after preparation | Crosscut after water storage at 63° C. for 1 h | Crosscut after water storage at 63° C. for 24 h | Crosscut after condensation clima test according to DIN EN ISO 6270-2 CH for 1 h | Crosscut after condensation clima test according to DIN EN ISO 6270-2 CH for 24 h | CASS test 240 h |
|---|---|---|---|---|---|---|
| B1a | 0 | 0 | 0 | 0 | 0 | nd |
| B1b | 0 | 0 | 0 | 0 | nd | 2 |
| B1c | 0 | 0 | 0 | 0 | 0.5 | nd |
| B1d | 0 | nd | nd | 0 | nd | 0.5 | nd = not determined

TABLE 4b

| Example no. | Crosscut after preparation | Crosscut after water storage at 63° C. for 1 h | Crosscut after water storage at 63° C. for 24 h | Crosscut after condensation clima test according to DIN EN ISO 6270-2 CH for 1 h | Crosscut after condensation clima test according to DIN EN ISO 6270-2 CH for 24 h | CASS test 240 h |
|---|---|---|---|---|---|---|
| B2a | 0 | 0 | 0 | 0.5 | 0.5 | nd |
| B2b | 0 | 0.5 | 0.5 | 0 | nd | 1.9 |
| B2c | 0 | 0 | 0 | 1.0 | 0.5 | nd |
| B2d | 0 | 0.5 | 0.5 | 0 | nd | 0.8 |
| C1a | nd | 5 | 5 | 5 | nd | nd | nd = not determined

TABLE 4c

| Example no. | CASS test 240 h | FFC, MU 672 h |
|---|---|---|
| B3a | 0.5 | 1.4 |
| B3b | 0.9 | 1.4 |

The invention claimed is:

1. A method for pretreating aluminum materials, wherein an aluminum material is successively:
   i) cleaned and subsequently rinsed,
   ii) optionally subjected to alkaline pickling and subsequently rinsed,
   iii) optionally contacted with an aqueous composition comprising at least one mineral acid,
   iv) optionally rinsed, and
   v) contacted with an acidic aqueous composition comprising:
      a) at least one compound selected from the group consisting of titanium, zirconium and hafnium compounds, and
      b) at least one copolymer soluble in the aqueous composition, the copolymer being a linear terpolymer prepared by controlled radical polymerisation and comprising:
         vinylphosphonic acid monomeric units m1 and
         hydroxyethyl- and/or hydroxypropyl-(meth)acrylate monomeric units m2 and
         (meth)acrylic acid monomeric units m3, and
   vi) optionally rinsed,
   vii) optionally contacted with another acidic aqueous composition,
   viii) optionally rinsed, and
   ix) optionally dried.

2. The method according to claim 1, wherein step iii) is performed and the at least one mineral acid is sulfuric acid and/or nitric acid.

3. The method to claim 1, wherein the composition in step iii) additionally comprises a titanium and/or zirconium compound.

4. The method according to claim 1, wherein the pH value of the composition in step v) is in the range of 2.0 and 6.0.

5. The method according to claim 1, wherein the concentration of component a) in the composition in step v) is in the range of 0.015 and 0.5 g/l, calculated as metal, and the concentration of component b) is in the range of 0.01 and 1 g/l, calculated as solid addition.

6. The method according to claim 1, wherein the component a) of the composition in step v) is at least one complex fluoride selected from the group consisting of the complex fluorides of titanium, zirconium, and hafnium.

7. The method according to claim 1, wherein the at least one copolymer of component b) of the composition in step v) is a terpolymer that contains vinylphosphonic acid monomeric units m1, present in the copolymer at a molar content of 5 to 50% based on the whole copolymer, hydroxyethyl- and/or hydroxypropyl-(meth)acrylate monomeric units m2, which are present in the copolymer at a molar content of 5 to 70%, typically 20 to 55% based on the whole copolymer and (meth)acrylic acid monomeric units m3, which are present in the copolymer at a molar content of 25 to 85%, typically 40 to 70% based on the whole copolymer.

8. The method according to claim 1, wherein the at least one copolymer of component b) of the composition in step v) is a terpolymer that contains 2-hydroxyethyl-(meth)acrylate and/or hydroxypropyl-(meth)acrylate, wherein the latter is 2-hydroxypropyl-(meth)acrylate, 3-hydroxypropyl-(meth)acrylate or a mixture of 2-hydroxypropyl-(meth)acrylate and 3-hydroxypropyl-(meth)acrylate, as monomeric units m2.

9. The method according to claim 1, wherein the component b) of the composition in step v) includes at least one copolymer selected from the group consisting of (meth)acrylic-acid-hydroxyethyl(meth)acrylate-vinylphosphonic-acid-terpolymers, and (meth)acrylic-acid-hydroxypropyl (meth)acrylate-vinylphosphonic-acid-terpolymers.

10. The method according to claim 1, wherein the composition in step v) additionally contains at least one poly (meth)acrylic acid having a number averaged molecular weight of at least 28,000 g/mol.

11. The method according to claim 1, wherein the composition in step v) additionally comprises c) at least one compound selected from the group consisting of organoalkoxysilanes, organosilanoles, polyorganosilanoles, organosiloxanes, and polyorganosiloxanes.

12. The method of claim 11, wherein the component c) is at least one organoalkoxysilane, organosilanole, polyorganosilanole, organosiloxane, and/or polyorganosiloxane, each comprising at least one amino group, urea group, imido group, imino group, and/or ureido group per organoalkoxysilane/organosilanole unit.

13. The method according to claim 1, wherein the composition in step v) additionally comprises d) at least one type of cation selected from the group consisting of cations of the metals of the groups IA, IIA, IIIA, VB, VIB, and VIIB of the periodic system of the elements, of lanthanides as well as of bismuth and of tin, and/or at least one corresponding compound.

14. The method according to claim 13, wherein the composition in step v) contains lithium cations.

15. The method according to claim 13 wherein the component d) is at least one of a molybdenum and/or a vanadium compound, having a concentration in the range of 1 to 400 mg/l, calculated as metal.

16. The method according to claim 1, wherein the composition in step v) additionally comprises a component e) which is at least one compound selected from the group consisting of substances affecting the pH value, organic solvents, water-soluble fluorine compounds, and nanoparticles.

17. The method according to claim 1, wherein the total fluorine content in the composition in step v) is in the range of 1.5 to 500 mg/l.

18. The method according to claim 1, wherein the composition in step v) contains ammonium ions and/or corresponding compounds.

19. The method according to claim 1, wherein the rinsing steps vi) and/or viii) are carried out.

20. The method according to claim 1, wherein the aluminum material is vi) rinsed and vii) contacted with an aqueous composition containing at least one linear terpolymer prepared by controlled radical polymerisation and comprising:
vinylphosphonic acid monomeric units m1, and
hydroxyethyl- and/or hydroxypropyl-(meth)acrylate monomeric units m2, and
(meth)acrylic acid monomeric units m3, and
wherein step viii) is omitted.

21. The acidic aqueous composition according to step v) of claim 1, wherein the acidic aqueous composition comprises:
a) at least one compound selected from the group consisting of titanium, zirconium, and hafnium compounds, and
b) at least one linear terpolymer prepared by controlled radical polymerisation and comprising:
vinylphosphonic acid monomeric units m1, and
hydroxyethyl- and/or hydroxypropyl-(meth)acrylate monomeric units m2, and
(meth)acrylic acid monomeric units m3.

22. A concentrate, wherein the composition of claim 21 can be prepared from the concentrate by diluting and optionally adjusting the pH value.

23. A conversion-coated aluminum material obtainable by the method according to claim 1.

24. A method of using an aluminum material treated with the method according to claim 1, the method comprising using the aluminum material in automotive construction, vehicle construction, aircraft construction and facade construction, particularly for wheels, edgings and other mounting parts, cans, beverage cans, tubes, films, profiles and housings, in the field of aluminum finishing, and for architectural construction elements made of aluminum or aluminum alloys in indoor and outdoor areas, in particular in window, facade, and roof construction.

25. The method according to claim 1, wherein the aluminum materials comprise aluminum wheels.

26. The method according to claim 1, wherein the concentration of component b) in the composition in step v) is in the range of 0.004 to 1.8 g/l, calculated as solid addition.

* * * * *